US010058803B2

(12) United States Patent
Li (10) Patent No.: US 10,058,803 B2
(45) Date of Patent: Aug. 28, 2018

(54) FILTER ASSEMBLY AND METHOD OF USE (71) Applicant: SYNFUEL AMERICAS CORPORATION, Sterling, VA (US)

(72) Inventor: Yongwang Li, Beijing (CN)

(73) Assignee: SYNFUEL AMERICAS CORPORATION, Sterling, VA (US)

( * ) Notice: Subject to any disclaimer, the term of this patent is extended or adjusted under 35 U.S.C. 154(b) by 342 days.

(21) Appl. No.: 14/975,498

(22) Filed: Dec. 18, 2015

(65) Prior Publication Data

US 2017/0173501 A1    Jun. 22, 2017

(51) Int. Cl.
*B01D 29/54* (2006.01)
*B01D 46/00* (2006.01)
*B01D 29/15* (2006.01)
*B01D 29/66* (2006.01)
*B01D 46/24* (2006.01)
(Continued)

(52) U.S. Cl.
CPC ............. *B01D 29/54* (2013.01); *B01D 29/15* (2013.01); *B01D 29/33* (2013.01); *B01D 29/52* (2013.01); *B01D 29/66* (2013.01); *B01D 46/0005* (2013.01); *B01D 46/0021* (2013.01); *B01D 46/2403* (2013.01); *B01D 2201/0415* (2013.01); *B01D 2201/184* (2013.01); *B01D 2265/06* (2013.01); *B01D 2267/30* (2013.01)

(58) Field of Classification Search
CPC ............ B01D 46/0021; B01D 46/2403; B01D 46/0005; B01D 29/52; B01D 29/54; B01D 29/15; B01D 29/33; B01D 29/66; B01D 2265/06; B01D 2201/0415; B01D 2201/184

See application file for complete search history.

(56) References Cited

U.S. PATENT DOCUMENTS 4,288,330 A    9/1981 Strub
4,473,472 A    9/1984 Muller
(Continued)

FOREIGN PATENT DOCUMENTS

FR    1 191 640 A    10/1959
FR    2380807 A1    9/1978
(Continued)

OTHER PUBLICATIONS

International Search Report for PCT/IB2016/057743 dated Mar. 24, 2017.
(Continued)

*Primary Examiner* — Robert Clemente
(74) *Attorney, Agent, or Firm* — Pillsbury Winthrop Shaw Pittman, LLP (57) ABSTRACT

A filtration element, which includes filtering tubes that are drilled with straight conical holes, and a central supporting tube and connecters/headcaps. The filtering tubes are arranged so that drilled surface portions face outwarded and the remaining undrilled surface portions are positioned adjacent to the central supporting tube. The filtration media can be made of tubular or flat metals or alloys. A plurality of filtration elements can be bundled using specially designed connectors to meet specific requirements for filtering of fine solid particles from liquids or gases or even liquid-gas-solid three phase. These elements can be used for various applications in filtration fields.

15 Claims, 8 Drawing Sheets (51) Int. Cl.
    *B01D 29/33*   (2006.01)
    *B01D 29/52*   (2006.01)

(56) References Cited

U.S. PATENT DOCUMENTS

| | | |
|---|---|---|
| 4,857,698 A | 8/1989 | Perun |
| 5,599,849 A | 2/1997 | Jager et al. |
| 5,844,006 A | 12/1998 | Jager et al. |
| 6,041,944 A | 3/2000 | Meier |
| 7,378,452 B2 | 5/2008 | Long et al. |
| 7,488,760 B2 | 2/2009 | Vogel |
| 8,022,109 B2 | 9/2011 | Hammond et al. |
| 8,704,127 B2 | 4/2014 | Nakamura et al. |
| 8,778,193 B2 | 7/2014 | Minnie et al. |
| 2005/0145567 A1 | 7/2005 | Quintel |
| 2016/0279544 A1* | 9/2016 | Jang ................ B01D 29/33 |

FOREIGN PATENT DOCUMENTS

| | | | | |
|---|---|---|---|---|
| GB | 1553063 A * | 9/1979 | ........... | B01D 29/445 |
| WO | WO 2015/080405 A1 | 6/2015 | | |
| WO | WO 2015/114812 A1 | 8/2015 | | |

OTHER PUBLICATIONS

International Preliminary Report on Patentability issued in corresponding PCT Application No. PCT/IB2016/057743 dated Dec. 13, 2017.

* cited by examiner

FILTER ASSEMBLY AND METHOD OF USE

BACKGROUND

Field

The present disclosure relates to a filtration assembly for the filtration of ultra-fine particles from liquids or gases.

Description of Related Art

Filtration is an important method that typically is used to separate solids from fluids (gases or liquids) for a variety of industries, from oil and gas processing to even food processing industries. In most industrial processes that rely on filtration, the replacement of filtration media is very frequent, leading to significant cost increase and the rise of issues of processing or recovery of the solid wastes of used filtration media.

The filtration media currently available for industrial application are diverse. Popular types of media are meshes or other type of intertextures or assembly of fibered materials, cemented metals, and membranes. These filtration media have torturous pores along the filtration direction, namely the fluid passing paths. During the filtration operation, these tortuous pores are easily blocked by embedding solid particles and these embedding particles are hard to be removed by any methods, for example, back flushing or back-washing, leading to rapid defunctionalization of the media.

For some critical applications at elevated temperatures and higher pressures, for example, in solid removal from waxy fluids, the sintered rigid metal meshes or sintered metal powder media are often used equipped with back flushing. Due to the blockage of the pores and/or mechanical damage (especially for rigid mesh type media), the life span of the filtration media is rather short, causing frequent unit shut down for replacement of filtration media.

There have been cases requiring in-situ filtration systems in chemical reactors, separation towers, and/or in an integrated machinery unit (e.g., in oil and gas industries). In cases like these, the filtration schemes commonly used are of tubular type of filters made of metal mesh media for easing regeneration by back washing (flushing). One common issue is the frequent replacement of filtration elements due to blockage or damage of filtration media. The filter tends to fail because of solids embedding in the pores of the filtration media. Because long term running is required in situations like these, shutdown of the systems (and, in some cases, a whole plant) for changing of the filters, or for back washing, is inconvenient and may be costly. Processes, such as the Fischer-Tropsch process, which require separation of solids from a suspension containing liquids, solids, and gases, require filtration units that must be back-flushed periodically, which can result in significant losses due to process interruptions. Filtration systems disclosed for such process are described in, for example, U.S. Pat. Nos. 5,599,849; 5,844,006; 7,378,452; 7,488,760; 8,022,109; and 8,778,193, the disclosures of each of which are incorporated by reference herein in their entireties.

Further, some filter systems use a filter web or filter fabric around an outer perimeter as a main filtering medium, or such that the filtration process takes place on the filter web or filter fabric. U.S. Pat. No. 4,473,472 and U.S. Pat. No. 6,041,944 provide examples utilizing a surrounding web or fabric. Such designs, however, are still subject to easy blockage and frequent replacement. Moreover, the surrounding filter web or filter fabric is typically placed around filter elements (or a bundle), and thus the surface area of the filter elements is not utilized effectively.

By changing the filter media and design of the structure, blockage of filtration pores may be avoided while maintaining or improving mechanical strength of the filter element.

SUMMARY

It is an aspect of this disclosure to provide a filtration element that includes a central support tube of a first diameter having a closed tube surface and a plurality of filtration tubes surrounding the central support tube. Each of the filtration tubes has a second diameter that is smaller than the first diameter of the central support tube. Each of the filtration tubes has a wall, the wall having pores extending at least partially around a surface of the filtration tube for filtering solids from fluids. Each of the pores extends through a thickness of the wall of the filtration tube and has a conical shape through the thickness of the filtration tube wall. The pores face outwardly relative to the closed tube surface of the central support tube.

Another aspect provides a filtration assembly. The assembly includes at least a first filtration element connected to a second filtration element. Each of the first filtration element and the second filtration element include a central support tube of a first diameter having a closed tube surface and a plurality of filtration tubes surrounding the central support tube. Each of the filtration tubes has a second diameter that is smaller than the first diameter of the central support tube. Each of the filtration tubes of each the first and second filtration elements has a wall, the wall having holes extending at least halfway around a surface of the filtration tube for filtering solids from fluids. Each of the holes extends through a thickness of the wall of the filtration tube and has a conical shape through the thickness of the filtration tube wall. The holes of each of the filtration tubes are facing outwardly relative to the closed tube surface of the central support tube in each filtration element. A connector connects the first filtration element to the second filtration element.

Other features, and advantages of the present invention will become apparent from the following detailed description, the accompanying drawings, and the appended claims.

BRIEF DESCRIPTION OF THE DRAWINGS

The features of this disclosure will be clear from the following DETAILED DESCRIPTION, formed in connection with the accompanying drawing, in which.

DETAILED DESCRIPTION

This specification discloses one or more embodiments that incorporate the features of this disclosure. The disclosed embodiment(s) merely exemplify the disclosure. The scope of the disclosure is not limited to the disclosed embodiment(s). The disclosure is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with one or more other embodiments whether or not explicitly described.

Disclosed herein is a filtration assembly 100, including tubes formed of filtration media with pores or holes formed or machined, for example, by drilling a plurality of holes simultaneously, or individually, either manually or using laser drilling apparatus. Due to the number of holes and precision by which they are formed, it would be desirable to form a plurality of holes simultaneously by using precision drilling, such as by a laser apparatus. As one example, the pores or holes could be formed at a rate of from about 50 to about 400 holes per second, or from about 100 to about 300 holes per second, or from about 150 to about 250 holes per second, or at about 200 holes per second. For purposes of this disclosure, "filtrate" is defined as a fluid (liquid or gas, or even liquid-gas-solid three phase) that is filtered or flows through the filtering assembly 100 for filtering of fine solid particles (e.g., <1 mm) therefrom. As explained in greater detail below, thinner-walled tubes of a smaller diameter (e.g., a diameter smaller than 25 mm) have limited mechanical strength as compared to conventional filtration tubes with typically larger diameter of above 25 mm. In particular, when forming filtration tubes via laser drilling, to control costs such that they are affordable while still providing sufficient mechanical strength, thinner tubes, e.g., less than 1.5 mm in thickness, may be used that have such smaller (inner) diameter. As noted above, however, these smaller diameter and thinner-walled tubes have limited mechanical strength. Accordingly, a tube bundle and filtration assembly 100 are disclosed herein to enable implementation and use of such smaller diameter filtration tubes having a smaller wall thickness in a filtration system.

Figure 1:
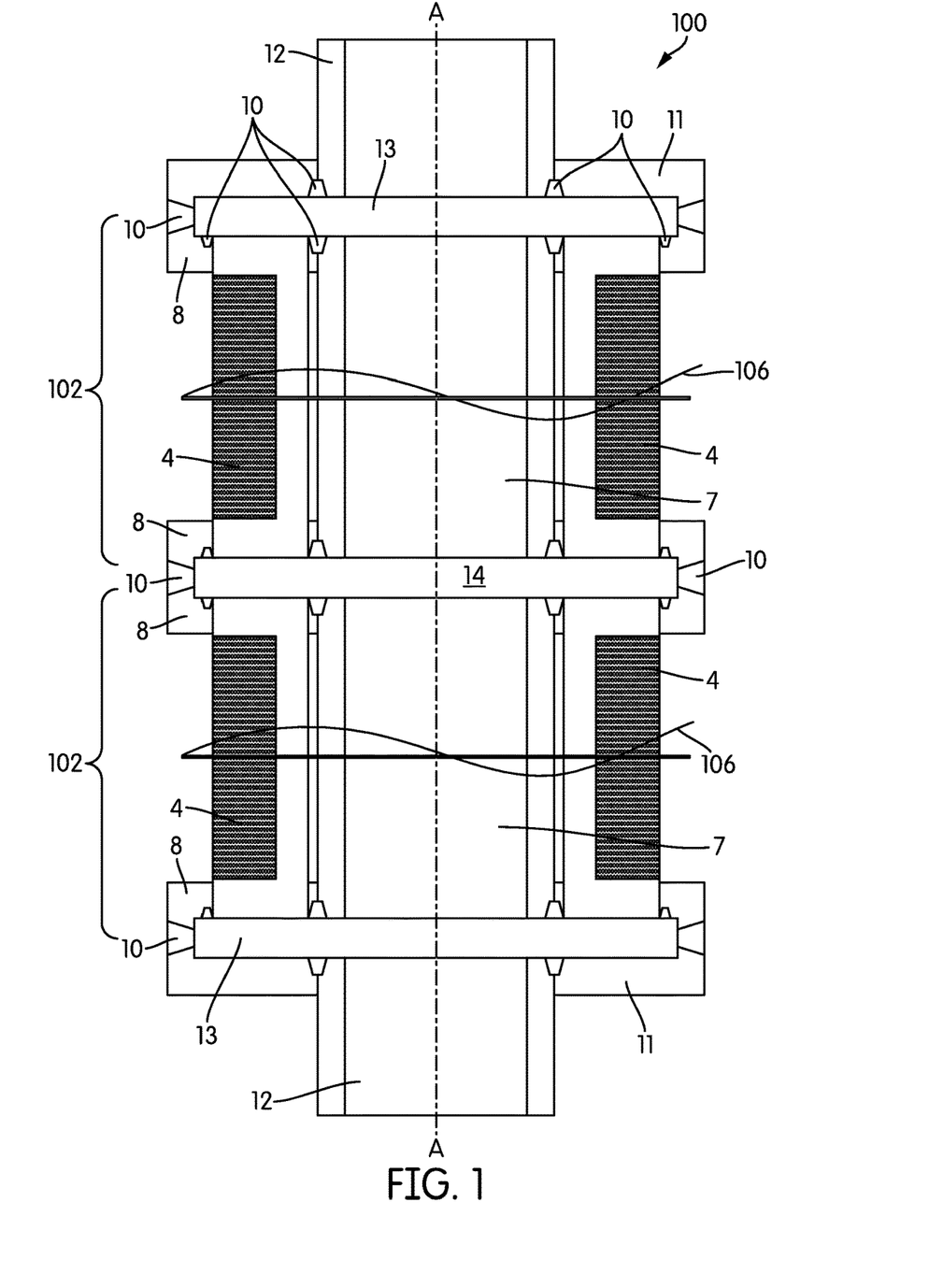
FIG. 1 is a side view of a filtration assembly in accordance with an embodiment of this disclosure.

FIG. 1 shows an exemplary side view of a structure of a filtration assembly 100 in accordance with an embodiment. The filtration assembly 100 may include two connected filtration elements 102 and 104 for illustrative purposes. However, any number of elements may be connected or stacked relative to one another. In addition, the elements 102 and 104 may be longer or shorter, or include additional stacked elements, as shown by break-line 106. Each of the elements 102 and 104 may include a central support tube 7 surrounded by multiple filtration tubes 4 (only two of which are shown in FIG. 1 for illustrative purposes), all of which may be fixed together in a bundle together via connectors 8, for example. Such features may be seen in greater detail in FIGS. 2 and 3. In use, the central support tube 7 of each filtration element is positioned in a vertical direction along a longitudinal axis A. Each of the filtration tubes 4 of each filtration element are positioned in a vertical direction as well, such that a longitudinal axis through a center of each of the filtration tubes 4 is generally parallel to the longitudinal axis A. The filtration assembly 100 may be connected to a piping configuration of a filtration system, as described in greater detail later (e.g., see FIGS. 18-21).

The central support tube 7 of each element 102 and 104 can be a hollow cylinder with a closed tube surface having an inner wall 23 and an outer wall 25, having a wall thickness T measured between the inner wall and the outer wall. The central support tube 7 may have an inner diameter dsi (measured within and relative to the inner wall) and an outer diameter dso (measured relative to the outer wall), as noted in FIG. 3, for example. The wall thickness T of the central support tube 7 may vary. In accordance with one embodiment, the inner diameter dsi and the outer diameter dso of the central support tube may be between approximately 5 mm (inclusive) to approximately 400 mm (inclusive), or from approximately 15 mm to approximately 350 mm, or from approximately 50 mm to approximately 200 mm, or within any range therebetween.

Each filtration tube 4 may also be comprised of a hollow cylinder that includes an inner wall 22 and an outer wall 24, having a wall thickness T2 measured between the inner wall and the outer wall. Each filtration tube 4 includes an inner diameter df (measured within and relative to the inner wall), noted in FIG. 3, and an outer diameter (measured relative to the outer wall. The thickness T2 of the filtration tubes 4 may vary. In an embodiment, each of the filtration tubes 4 has a similar or the same inner diameter df. In an embodiment, the filtration tubes 4 have an inner diameter df that is less than approximately 25 mm. In one embodiment, the inner diameter df of each the filtering tubes 4 is within a range between approximately 5 mm (inclusive) to approximately 20 mm (inclusive). In another embodiment, the inner diameter df of the filtration tubes 4 is below approximately 10 mm. Further, as previously noted, the filtration tubes 4 of this inner diameter (e.g., ~5 mm to ~20 mm) may be designed to include a thickness that is smaller than approximately 1.5 mm (as provided by conventional or known designs). This is because the thickness of the tube should be thin enough to enable the laser drilling operation used to form the filtration tubes 4 as disclosed herein, while still maintaining a certain thickness for sufficient mechanical strength. In accordance with an embodiment, the filtration tubes 4 have a wall thickness of approximately 10 microns (inclusive) to approximately 1500 microns (inclusive). In another embodiment, the filtration tubes 4 have a wall thickness of approximately 100 microns (inclusive) to 1000 microns (inclusive). In yet another embodiment, the filtration tubes 4 have a wall thickness T2 of approximately 100 microns (inclusive) to approximately 500 microns (inclusive). In still yet another embodiment, the filtration tubes 4 have a wall thickness T2 of approximately 100 microns (inclusive) to approximately 300 microns (inclusive).

For such filtration media of tubular shapes as those disclosed herein, reducing the thickness of the tube wall reduces the cost of drilling the filtration holes while still maintaining sufficient mechanical strength of the filtration media. For example, the ratio of the wall thickness to tube inner diameter (T2:df) for the filtration tubes 4 can be within the range of from about 1.5:5 (0.3) to about 0.01:20 (0.0005), or from about 0.005 to about 0.1, or from about 0.01 to about 0.05. In an embodiment, the wall thickness can be anywhere from about 50 to about 2,000 μm, or from about 100 to about 1,500 μm, or from about 200 to about 1,000 μm. In another embodiment, the inner diameter (df) for the tube 4 can be anywhere from about 1 mm to about 50 mm, or from about 3 mm to about 30 mm, or from about 5 to about 15 mm. The thickness of the tube wall (T2) will depend, in part, on the size of the holes formed in the tube wall, the number of holes, the distance between the holes, the material used to fabricate the tube, as well as the inner tube diameter. Those skilled in the art will be capable of designing a suitable tube 4 having an appropriate number of holes, thickness, diameter, and the like, using the guidelines provided herein.

Figures 2, 3, 4:
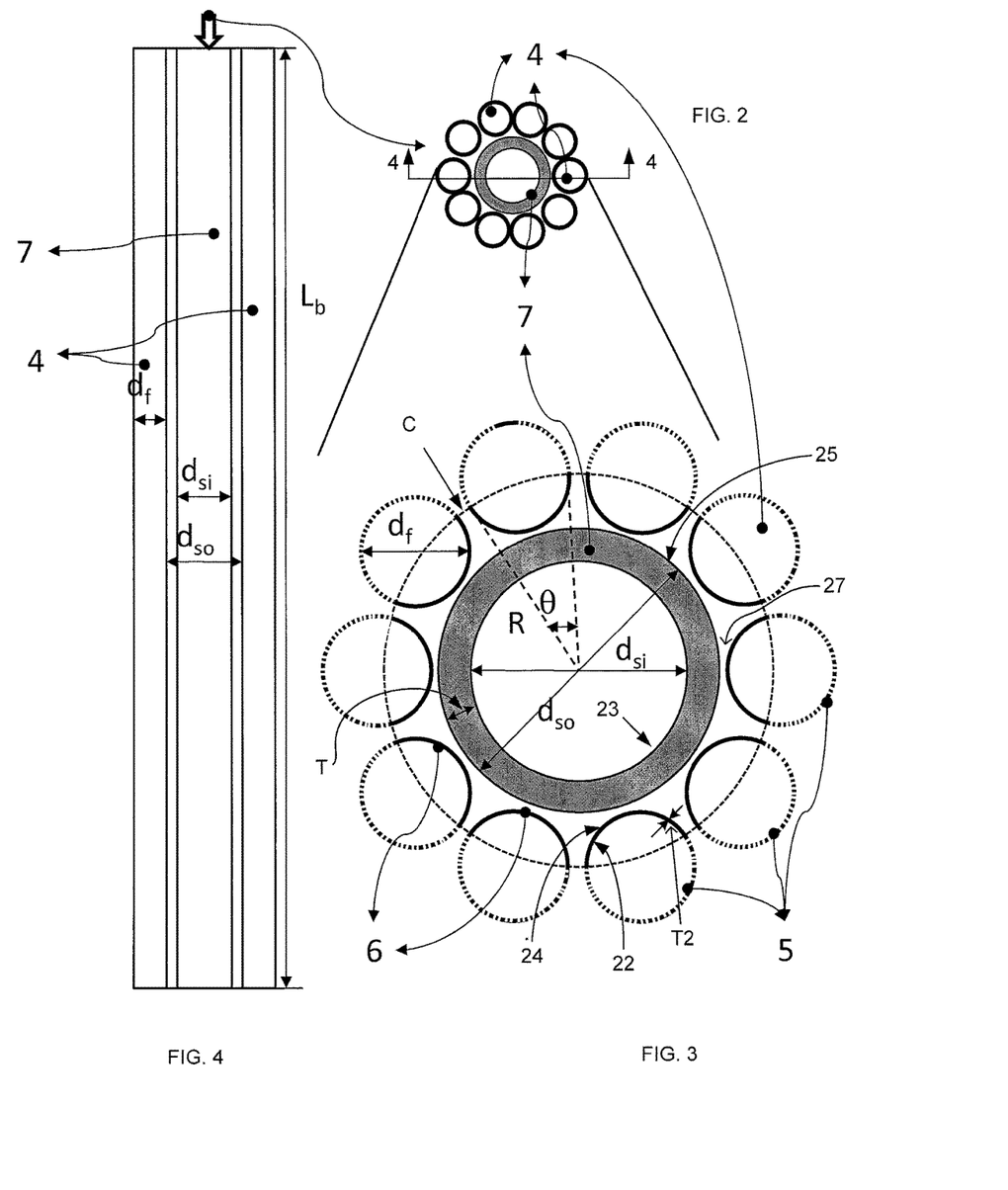
FIG. 2 is a schematic top view of tubes of a filtration element for assembly for the filtration assembly of FIG. 1 in accordance with an embodiment.
FIG. 3 is a detailed view of the tubes of FIG. 2 in accordance with an embodiment.
FIG. 4 is a cross sectional view of the tubes of FIG. 2 along line 4-4.
Figure 5:
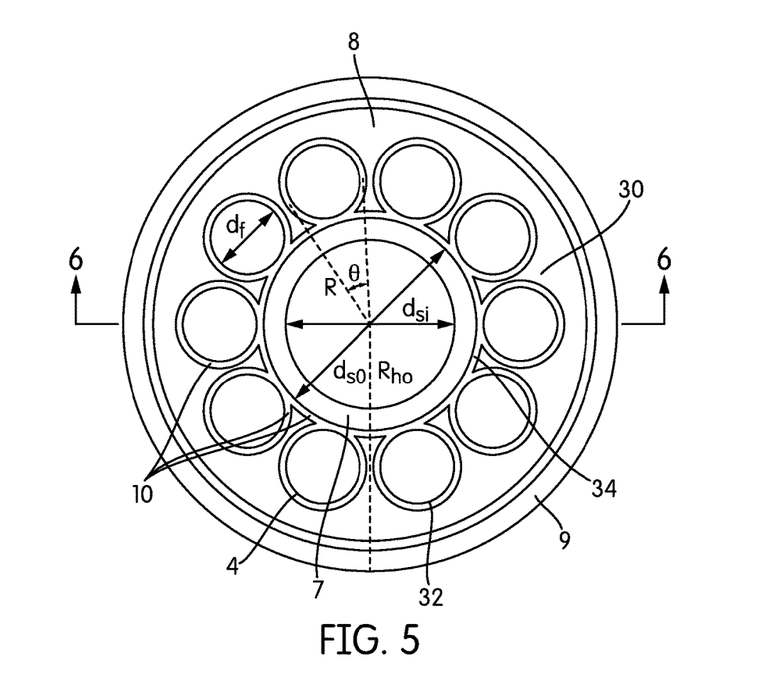
FIG. 5 is a top view of a bundle of filtration tubes surrounding a central support tube that are part of the filtration assembly of FIG. 1, connected at one end by a connector in accordance with an embodiment.

In addition, each cylinder of each of the filtration tubes 4 includes an undrilled (blind) or closed wall portion 6 and a drilled or open wall portion 5. As will be understood throughout this disclosure, an "open" wall portion 5 is a portion of a tubular wall having pores or holes laser drilled therein (such that liquids may travel through the open pores or holes). A size, amount, or distance of the open wall portion 5 may be determined based on the dimensions of the central support tube 7, and/or the dimensions of the filtration tube 4 itself. Specifically, as shown in FIG. 3, the filtration tubes 4 are positioned circumferentially around the central support tube 7, such that the tubes 4 are adjacent to and/or in contact with an outer wall of the central support tube 7. In an embodiment, the tubes 4 do not physically contact the outer wall of central support tube 7 because vibration may cause wear and compromise the integrity of the tube walls. In this embodiment, there is a small space 27 between the tubes 4 and the outer wall 25 of central tube 7, for example, at least about 0.25 mm, or at least about 0.5 mm, or at least about 1 mm. In the illustrated embodiment, the tubes 4 are also adjacent to and/or in contact with outer walls of adjacent filtration tubes 4. In an embodiment, the tubes may not physically contact each other for the same reasons stated above, but rather there is a small space between each respective tube. For example, FIG. 5 illustrates one embodiment including ten filtration tubes 4 surrounding central support tube 7, wherein each of the filtration tubes 4 are in contact with the outer wall of the central support tube 7 and in contact with part of the outer wall of two adjacent filtration tubes 4 (on either side). Accordingly, to measure and determine a size of the open wall portion 5 (or, alternatively, a size of the closed wall portion 6) of each of the filtration tubes 4 for including laser drilled holes therein, an angle θ may be measured from a center point (provided on the central longitudinal axis A) of the central support tube 7 to each side of the outer wall of a filtration tube 4. Based on the measured angle θ, then, each of the filtration tubes 4 may be drilled to form pores therein.

As demonstratively shown by circle C in FIG. 3, each of the filtration tubes 4 of (each filtration element, e.g., 102 and 104) are positioned around the support tube 7, each including a blind wall portion 6 that faces the outer wall of the central support tube 7 (faces inward), while the open wall portion 5 (porous wall) faces away from the central support tube (faces outward).

In accordance with an embodiment, the open wall portion 5 covers approximately half (50%) of tubular surface of the filtration tube. That is, pores or holes are drilled through the wall thickness T2 approximately halfway around the tube 4. The wall of each filtration tube 4 may have pores or holes extending at least halfway around a surface of the filtration tube 4 for filtering solids from fluids in one embodiment. In another embodiment, more than half (more than 50%) but also less than approximately 75% of the filtration tubes 4 include pores or holes therein. Those skilled in the art will be capable of determining the extent of the open wall portion 5 in filtration tube 4, using the guidelines provided herein.

The pores or holes of the filtration tube 4 face outwardly relative to the closed tube surface (i.e., the outer wall 25) of the central support tube 7. That is, the closed wall portion 6 of the tubes 4 may be positioned adjacent to, proximal to, and/or in contact with the outer wall 25 of the closed tube surface of the central support tube 7, while the drilled or open wall portion 5 faces outwardly or is positioned distally relative to (away from) the closed tube surface of the central support tube 7. This configuration provides a filtration element 100 having a significantly increased filtration surface area, denoted by the sum of the surface area of the open wall portions 5 of each filtration tube 4, when compared to a conventional single tubular filtration element. This configuration may provide improved filtration efficiency.

In an embodiment, the central support tube 7 and each of the filtration tubes 4 have a substantially similar length (or height) Lb (see cross section of FIG. 4). The length of the central support tube 7 and the filtration tubes 4 may vary. In some cases, the length Lb of the tube bundle may depend on an amount of space or size available for implementing the filtration assembly 100.

As noted throughout, the assembly of the central support tube 7 with surrounding filtration tubes 4 is referred to as a "tube bundle" or "bundle." In one embodiment, as shown in FIG. 5, ten filtration tubes 4 are positioned around the central support tube 7 to form a bundle that is used in each filtration element 102, 104. More specifically, each of the ten filtration tubes 4 of FIG. 5 have an inner diameter between approximately 5 mm to approximately 20 mm, and the central support tube 7 may have an inner diameter between approximately 5 mm to approximately 400 mm. Also, the wall thickness T2 of each of the filtration tubes 4 (and thus the pores in the open wall portion 5) may be between approximately 10 micron and approximately 1500 micron. However, it should be noted that the illustrated number of tubes in the tube bundle of each filtration element is not intended to be limiting. That is, depending on the dimensions (e.g., diameters and thickness T) of the central support tube 7 that is implemented in the filtration assembly 100, the number, diameters, and thickness of the filtration tubes 4 surrounding the central support tube 7 may vary. Accordingly, this disclosure is not intended to be limited by the number of filtration tubes 4 disclosed herein. Further details and features of each of the elements are also described below.

Figure 6:
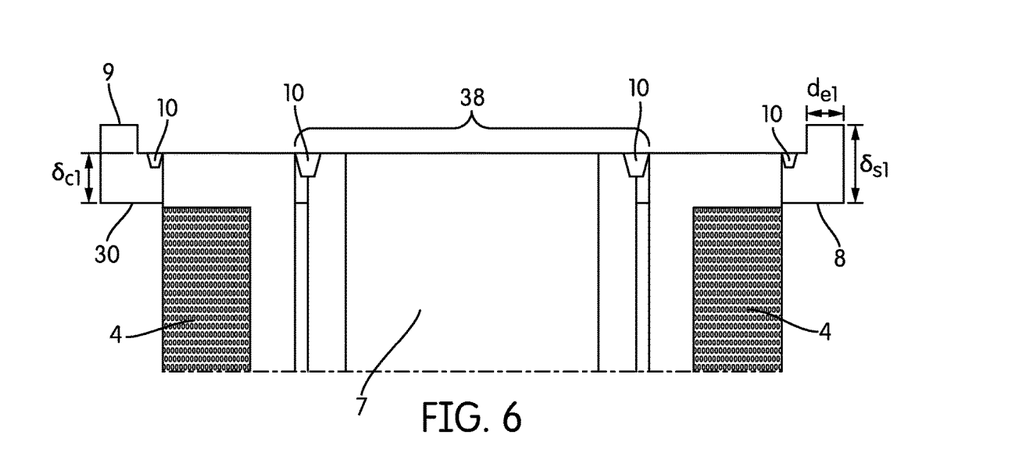
FIG. 6 a side sectional view, in part, of the connector at a first side (top) of the bundle of FIG. 5.

To connect the bundle of filtration tubes 4 and the central support tube 7, one or more connectors 8 are provided. FIG. 6 is a side view illustration of an example of one connector 8 provided at a first end (e.g., top) of the assembled bundle of tubes (see also FIG. 5). The connector 8 is designed for positioning at least around the bundle, for example, such that the smaller/thinner filtration tubes 4 are positioned with their drilled open wall portions 5 or surfaces facing outwardly relative to the central support tube 7, as noted above. Each connector 8 may not only connect the assembled bundle, but may also be designed to connect adjacent bundles of tubes together (e.g., connect one bundle or element 102 having a first central support tube 7 with surrounding filtration tubes 4 and to another (vertically aligned) bundle or element 104 having a second central support tube 7 with surrounding filtration tubes 4). In accordance with an embodiment, the connector 8 may be formed from a plate 30. In one embodiment, as illustrated in FIGS. 5-6, the plate 30 of each connector 8 may be a circular or round plate having radius of Rho (see FIG. 5) and a thickness of $\delta c1$ (see FIG. 6). On its outer edge, the plate 30 may include a step 9 with a height of $\delta s1 - \delta c1$ that extends from the surface and width of de1 (as shown in FIG. 6) from an outer edge of the plate 30. The step 9 may be a single portion that extends around and from an entire edge (e.g., circumference) of the plate 30, for example, or, in some embodiments, include several distinct portions or steps that are positioned around an edge of the plate 30. The direction in which the step 9 extends is not intended to be limited. That is, although FIG. 6 illustrates the step 9 extending upwardly or above the plate 30, it should be understood that the step 9 may be positioned such that it extends below the plate 30 (e.g., flipped over). Such positioning of the step 9 may depend upon the mounting position of the plate 30, for example, and, upon its connection with another part (e.g., a headcap 11, described further below).

The plate 30 of connector 8 further includes a plurality of holes therein for receipt of the tubes in the bundle for fixing the end of the bundle. More specifically, holes 32 may be formed in the plate 30 to fit or receive filtration tubes 4 of diameter df and hole 34 may be formed to fit or receive supporting tube 7 of outer diameter dso. In an embodiment, all the ends of the tubes 4, 7 in the bundle are embedded at a level of an internal plane surface of the connecter 8, and further fixed with complete sealing by welding in a number of weld zones 10 (shown in FIG. 6). Of course, the use of welding in weld zones 10 for securing the plate 30 and tube bundle is not intended to be limiting. Other methods or devices for securing the ends of the bundle to the plate 30 may also be used.

Accordingly, although only one end is shown in FIGS. 5 and 6, it should be understood that another connecter 8 of similar construction may be used to fix the bundle at or near its opposite end (e.g., bottom), such as shown in FIG. 1. Moreover, one or more additional connectors 8 may be used in the middle of the bundle, or, additionally and/or alternatively, at any point between the two end connectors 8. Each connector 8 used with the tube bundle may be secured (e.g., via welds in welds zones, or by other methods/devices) to the tubes 4, 7, in the bundle, and provided at any point along the length Lb of the bundle between its two ends.

Further, as previously noted, several such bundles or elements 102, 104 can be connected together through the connecters to form a filtration assembly 100, e.g., by stacking and aligning the elements 102 and 104 vertically relative to one another and welding the steps 9 of two connecters 8 together (one by one) at weld zones 10. This simulates a large diameter filtration tube (which may be conventionally used in the art), although as explained above, the configuration described herein provides a far greater filtration surface area. In the exemplary configuration of FIG. 1, for example, four connectors 8 are shown, e.g., a first top connector 8 at a top of the element 102, a first bottom connector 8 at a bottom of element 102, a second top connector 8 at a top of the element 104 that is connected or welded to the first bottom connector 8 at the bottom of the element 8, and a second bottom connector 8 at a bottom of element 104.

The use of a round plate 30 as the structure of the connectors 8 as shown in the Figures is not intended to be limiting, and it should be understood that other shapes and configurations and devices for connectors 8 may be used that are configured to connect the tubes (central support tube 7 and filtration tubes 4) of the bundle.

Figure 7:
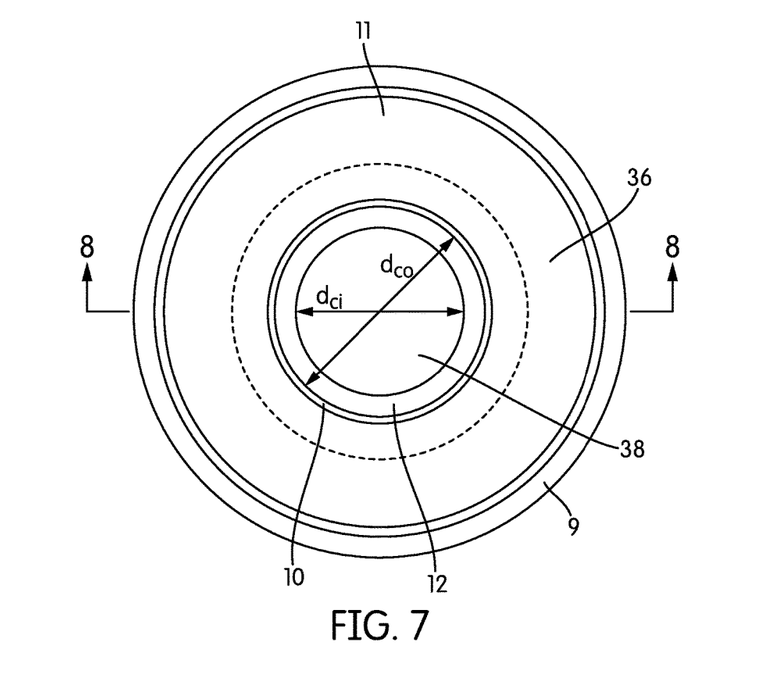
FIG. 7 is a top view of a headcap of the filtration assembly of FIG. 1 provided on an end of the bundle in accordance with an embodiment.
Figure 8:
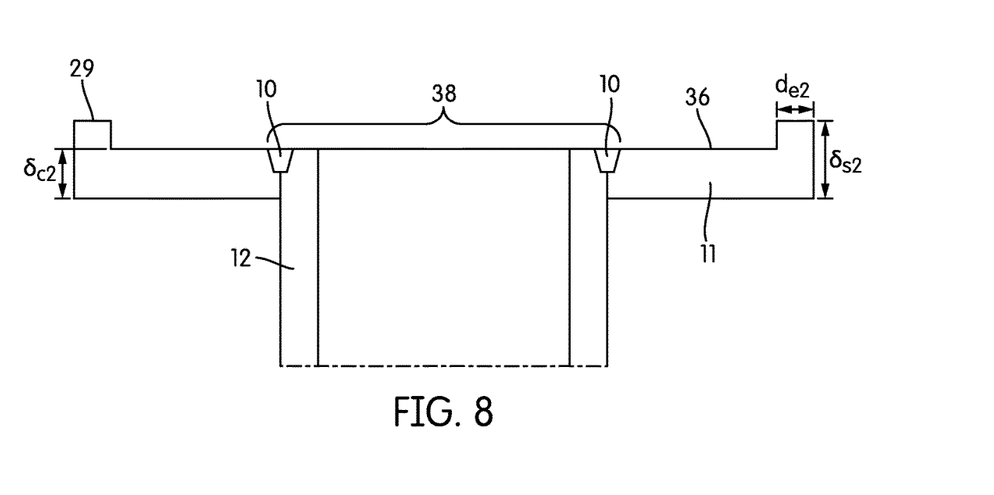
FIG. 8 a side sectional view, in part, of the headcap at a first side (top) of the bundle.

In addition to the connectors 8, a headcap 11 may be provided on either end (top and bottom) of the tube bundle or connected elements 102 and 104 in the filtration assembly 100, as shown in FIG. 1, to terminate the two ends of the connected elements 102 and 104, and to fit piping needs for filtration equipment. For example, FIGS. 7 and 8 illustrate an example of one headcap 11 (e.g., provided at a first side or end (e.g., top)) on the connected tube bundles. A similar headcap 11 may be provided at a second side or end (e.g., bottom) on the connected tube bundles (see FIG. 1). Each headcap 11 may be configured for alignment and fitting with the connector 8 such that the ends of the assembly are closed off. In accordance with an embodiment, the headcap 11 may be formed from a plate 36. In one embodiment, as illustrated in FIGS. 7-8, the plate 36 is a circular or round plate having radius substantially similar to the radius Rho of the plate 30 of connector 8. The plate 36 has a thickness of $\delta c2$ (see FIG. 8). On its outer edge, the plate 36 may include a step 29 with a height of $\delta s2 - \delta c2$ that extends from the surface and width of de2 (as shown in FIG. 8) from an outer edge of the plate 36. The step 29 may be a single portion that extends around and from an entire edge (e.g., circumference) of the plate 36, for example, or, in some embodiments, include several distinct portions or steps that are positioned around an edge of the plate 36.

The direction in which the step 29 extends is not intended to be limited. That is, although FIG. 8 illustrates the step 29 extending upwardly or above the plate 36, it should be understood that the step 29 may be positioned such that it extends below the plate 36 (e.g., flipped over). Such positioning of the step 29 may depend upon the mounting position of the plate 36, for example, with the connector 8, and, upon its connection with another part (e.g., a connector 8). More specifically, as shown in FIG. 1, the step 9 of the connector 8 may be aligned with the step 29 of the headcap 11 for closing off the ends of the assembly 100. In an embodiment, such as represented in FIG. 1, for example, each headcap 11 may be connected to a connector 8 via welding at weld zones 10. Specifically, a top headcap 11 is connected/welded to the first top connector 8 at the top of the element 102 and a bottom headcap 11 is connected/welded to the second bottom connector 8 at the bottom of the element 104. Other connection methods or devices, however, may be used.

When adjacent connectors 8 and/or headcaps 11 are assembled, free spaces 13 or 14 may be formed between their associated structures, as representatively shown in FIG. 1, for example. That is, in accordance with an embodiment such as illustrated in FIG. 1, free spaces 13 are provided between the headcaps 11 and connecters 8 at the top and the bottom of the filtration assembly 100. A free space 14 is also provided between two adjacent connectors 8 that are provided between the ends of the bundle (e.g., substantially in the middle of the bundle) for connecting the tube bundle. The spaces 13 and 14 are formed via alignment and connection of the steps 9 and/or 29 on the connectors 8 and headcaps 11.

The plate 36 of headcap 11 may further include an opening 38 therein for receipt of a conduit tube 12. The conduit tube 12 can be configured for insertion and embedding into the opening 38 for fixation (e.g., via welding at weld zones 10) relative to the tube bundle. The conduit tube 12 may be part of a filtration system, for example, and may be provided at one or both of the top and bottom ends of the filtration assembly 100. The conduit tube 12 includes an outer diameter and an inner diameter, as well as a length. The inner and/or outer diameters of the conduit tube 12 may be substantially similar to the diameters of the central support tube 7, for example. The central support tube 7 may be formed with dimensions such that it aligns with the conduit tube 12, for example. Further, the size or dimensions of the opening 38 in headcap 11 may correspond to the size or dimensions of the conduit tube 12. For example, the opening 38 may have a diameter (or radius) that substantially corresponds to the diameter (or radius) of the outer diameter of the conduit tube 12, e.g., slightly larger, such that the conduit tube 12 may be press fit into, or inserted into the opening 38 of the plate 36 of the headcap 11. In an embodiment, an end of the conduit tube 12 is embedded at a level of an internal plane surface of the headcap 11 (shown in FIG. 1). If so desired, the conduit tube 12 may be secured to the headcap 11 via welding at weld zones 10. The use of welding in weld zones 10 for securing the plate 38 and conduit tube 12 is not intended to be limiting. Other methods or devices for securing an end of the conduit tube 12 to the plate 38 may also be used.

Any types of metals, alloys, plastics, ceramics, and/or fibers may be used to form the filtration tubes 4 and/or central support tube 7, and/or conduit tube 12, in accordance with one embodiment. Further, the filtration tubes 4 may be formed from tubular or flat sheet portions with laser drilled pores or holes therein. The design, arrangement, and configuration of the micro pores or holes on each of the filtration tubes 4 is not limited.

Figure 9:
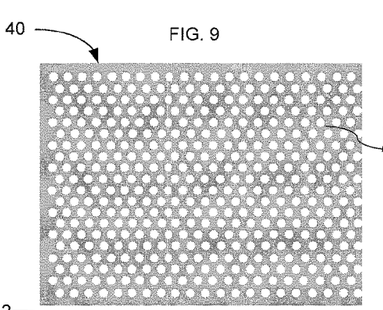
FIG. 9 is a sheet with pores or holes for filtering in a design for use in a filtration tube in accordance with an embodiment.
Figures 10, 11:
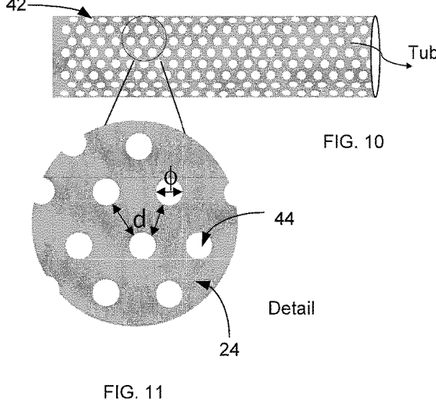
FIG. 10 is a tube with pores or holes similar to FIG. 9 for filtering in a design for use in a filtration tube in accordance with an embodiment.
FIG. 11 is a detailed view of the pores or holes in the tube of FIG. 10.

In an embodiment, the micro pores or holes of each filtration tube 4 may be arranged in a pattern or array relative to one another. FIG. 9 illustrates an example of a sheet 40 with pores 44 or holes that are uniformly distributed in a triangular format over a space (e.g., over the open wall portion 5 of each filtration tube 4) with equal distances between the adjacent holes. That is, the design of FIG. 9 is an example of an arrangement of pores, for example, in a relatively triangular pattern, or a polka dot pattern, for use in filtration tubes 4, in accordance with an embodiment. The filtration tube 4 may be manufactured via providing approximately round or circular pores 44 that are drilled into the sheet 40 (either individually drilled, or drilled using controlled technology that enables drilling of a plurality of holes simultaneously, preferably with a laser), which may be formed into a tube 42. In another embodiment, the micro pores 44 or holes may be laser drilled directly onto a tube. FIG. 10 shows an exemplary tube 42 with laser drilled micro pores 44 or holes (similar to those of FIG. 9) for filtering in a design for use in a filtration tube like tube 4, in accordance with an embodiment. As shown in greater detail in FIG. 11, the laser-drilled pores 44 or holes may each have an opening 46 on the outer surface 24 of the filtration tube 4 of size or diameter 4. Each of the openings 46 of the pores 44 may be provided at a distance d relative to other pores 44 in a substantially triangular fashion. As will be appreciated by those skilled in the art, the diameter and shape of the pores 44 may vary along the longitudinal or lateral extant of the sheet 40 or tube 42. For example, the diameter of the pores at the upper portion of the filtration assembly 100 (see FIG. 1) may be smaller and differently shaped than the pores at the lower portion of the filtration assembly, if it is determined that the concentration and/or size of particles to be filtered are greater near the bottom portion of the assembly. Those skilled in the laser drilling art will be capable configuring a laser drilling apparatus to configure the pores 44 in any suitable manner, using the guidelines provided herein.

Figure 12:
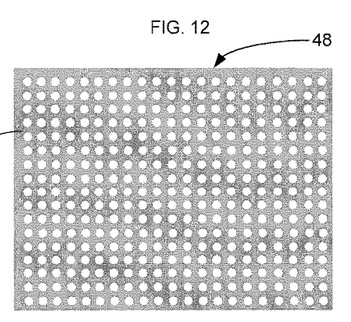
FIG. 12 is a sheet with pores or holes for filtering in a design for use in a filtration tube in accordance with another embodiment.
Figure 13:
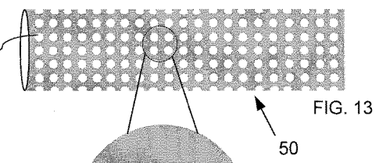
FIG. 13 is a tube with pores or holes similar to FIG. 12 for filtering in a design for use in a filtration tube in accordance with an embodiment.
Figure 14:
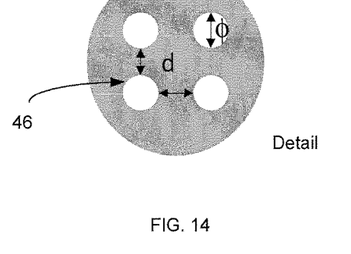
FIG. 14 is a detailed view of the pores or holes in the tube of FIG. 13.

In another embodiment, as shown in FIGS. 12-14, the micro pores 44 or holes may be arranged in a substantially linear pattern relative to one another. FIG. 12 illustrates an example of a sheet 48 with pores 44 or holes that are uniformly distributed in a linear or rectangular format over a space (e.g., over the open wall portion 5 of each filtration tube 4) with equal distances between holes in either longitude line or latitude line. That is, the design of FIG. 12 is an example of an arrangement of pores, for example, in a relatively rectangular pattern for use in filtration tubes 4, in accordance with an embodiment. The filtration tube 4 may be manufactured via providing approximately round or circular pores 44 that are drilled into the sheet 48, (either individually drilled, or drilled using controlled technology that enables drilling of a plurality of holes simultaneously, preferably with a laser), which may be formed into a tube 50.

In another embodiment, the micro pores 44 or holes may be laser drilled directly onto a tube. FIG. 13 shows an exemplary a tube 50 with laser drilled micro pores 44 or holes (similar to those of FIG. 12) for filtering in a design for use in a filtration tube like tube 4, in accordance with an embodiment. As shown in greater detail in FIG. 14, the laser-drilled pores 44 or holes have an opening 46 on the outer surface 24 of the filtration tube 4 of size or diameter 4. Each of the openings 46 of the pores 44 are provided at a distance d relative to other pores 44 in a substantially linear or rectangular fashion. As described above, the diameter and shape of the pores 44 may vary along the longitudinal or lateral extant of the sheet 48 or tube 50.

Figures 15, 16:
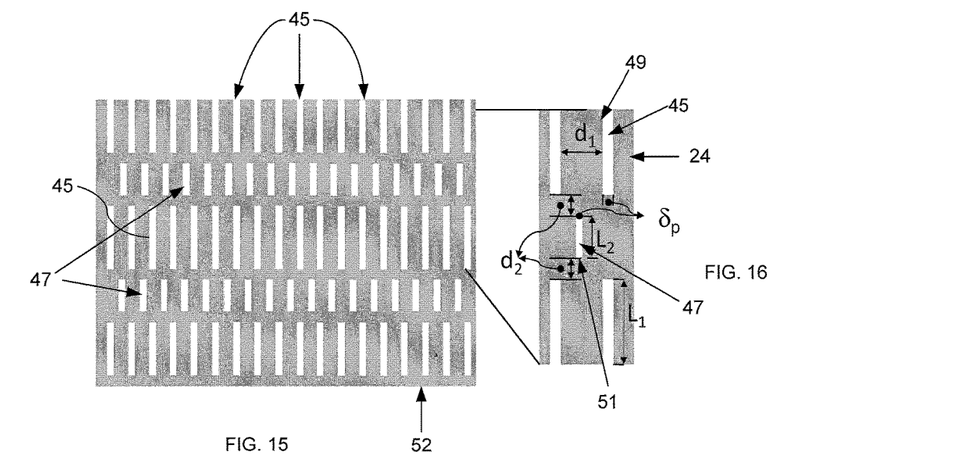
FIG. 15 is a sheet with pores or holes for filtering in a design for use in a filtration tube in accordance with yet another embodiment.
FIG. 16 is a detailed view of the pores or holes in the tube of FIG. 15.

In yet another embodiment, the micro pores or holes in the filtration tubes 4 may be rectangular pores 45 (instead of substantially round or circular pores 44) having a width $\delta p$, as shown in FIGS. 15 and 16, for example. FIG. 15 illustrates an example of a sheet 52 with rectangular pores 45 or holes arranged, for example, in a relatively linear or rectangular pattern, for use in filtration tubes 4, in accordance with an embodiment. The filtration tube 4 may include approximately rectangular pores 45 and 47 that are drilled into the sheet 52, (either individually drilled, or drilled using controlled technology that enables drilling of a plurality of holes simultaneously, preferably with a laser), which may be formed into a tube. In another embodiment, the micro pores 45 and 47 or holes may be laser drilled directly onto a tube (not shown). As shown in greater detail in FIG. 16, two sizes of laser-drilled pores 45 and 47 are provided for use on an outer surface 24 of the filtration tubes 4, in accordance with an embodiment. Each of the pores 45 and 47 have an opening 49 and 51 (respectively) on the outer surface 24 of the filtration tube 4. A first rectangular pore 45 has an opening 49 of length L1 and a second rectangular pore 47 has an opening of length L2. In accordance with an embodiment, length L1>length L2, resulting in longer rectangular pores 45 relative to the shorter rectangular pores 47. However, it is envisioned that in some embodiments, all of the rectangular pores used in filtration tubes 4 have similar length.

As seen in FIG. 15, alternating rows of first rectangular pores 45 and second rectangular pores 47 may be provided in the surface of the sheet 52 and used as part of the filtration tubes 4. Each of the openings 49 and 51 may be aligned in a parallel fashion relative to adjacent openings in the same row. In accordance with an embodiment, each opening 49 and 51 of the rectangular pores 45 and 47 have a similar size or width δp. In each row, the (openings 49 and 51 of the) pores 45 and 47 are provided at a distance d1 relative to another parallel and adjacent pore (see FIG. 16). As also shown in FIG. 16, the row of pores 45 may be provided at a distance d2 relative to the row of pores 47.

The use of rectangular pores 45 and 47, such as shown in FIGS. 15 and 16, allows for greater control of the size of pores and lengths for optimization of the void space and the mechanical strength and thus may lead to stronger bridges between pores and, at the same time, a higher void space for filtration.

Each of the patterns or designs of FIGS. 9-16 are examples of designs for the filtrations tubes 4 that consider and result in both higher void space and mechanical strength when used in filtration tubes 4. It should be understood that the depiction of pores in FIGS. 9-16 is exaggerated for explanatory purposes, and is not intended to show an exact size or placement of the pores on the filtration tubes 4 as intended by this disclosure.

In addition, it should be noted that although the illustrated embodiments depict the pores or holes on the area or portion of the open wall portion 5 (facing outwardly away from the central support tube 7) as being substantially uniform, such uniformity or consistency for the distribution and drilling of the holes, as shown in the Figures, is not intended to be limiting. For example, smaller closed wall portions may be provided between or around rows or designs of pores or holes, while still providing an open wall portion 5 that covers approximately half (50%) of the filtration tube 4.

Further, the positioning of the pores or holes in or on the sheets or tubes may be based on the positions of the connection areas or weld joints. In one embodiment, for example, the ends of the sheets may be folded to form the tube and welded together longitudinally. The location of the longitudinal weld joint in each tube when assembled as part of a filtering element, may be provided, for example, adjacent to or against the outer wall 25 of the central support tube 7. Accordingly, the pores or holes may be drilled in a center area of the sheet (or tube), such that when the tube and filtration element are connected and assembled, the pores will face outwardly relative to the central support tube 7.

In accordance with an embodiment, each of the pores or holes in the filtering tubes 4 can be laser drilled, each having a diameter of from about 0.25 to about 1,000 μm, or from about 0.75 to about 500 μm, or from about 1 to about 250 μm microns (inclusive), and configured to separate fine solid particles of <1 mm (approximately) from filtrate filtered through the filtration assembly 100. The minimum size of the pores can be determined based on the drilling capability, the fluid to be filtered, and the material used to fabricate the sheet (or tube). In an embodiment, the minimum pore size opening is about 1 μm. The hole opening coverage ratio or hole voidage is at least 1% for fine pores of 2-5 microns, and maximum 25% voidage for 10-250 micron pores. Hole voidage can be the percentage of hole opening area based on the entire surface area of the sheet.

Figure 17:
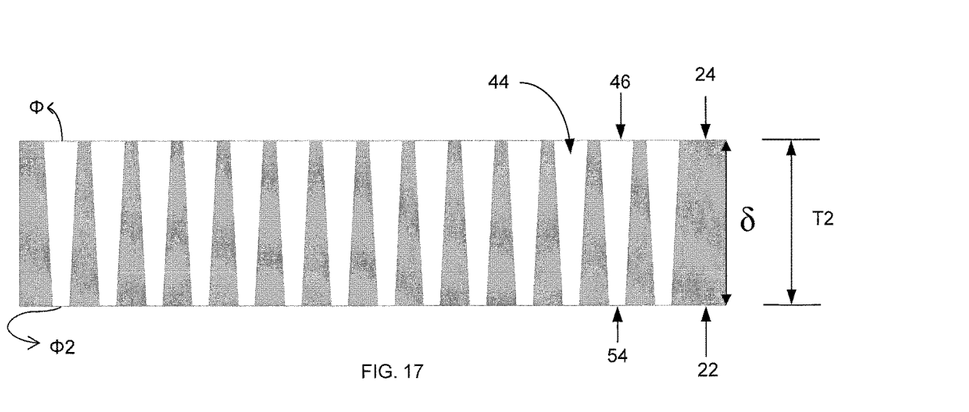
FIG. 17 is a cross sectional view of the pores or holes across a wall thickness of the filtration tubes used in the filtration assembly of FIG. 1, in accordance with an embodiment.

Despite the size, shape, configuration, and/or arrangement of the pores in the filtration tubes 4, in accordance with an embodiment, the pores illustratively depicted herein (e.g., in FIGS. 9-16), including other sizes, shapes, configurations, and/or arrangements of pores or holes not explicitly illustrated, have a thickness δ through the wall of the filtration tube 4. FIG. 17 illustrates an exemplary cross sectional view of pores of an open wall portion 5 of a filtration tube 4. As shown, the thickness δ of each pore extends from the outer surface 24 of the wall to the inner surface 22 of the wall. Accordingly, the thickness δ of each pore equals the thickness T2 of the filtration tube 4. That is, the thickness δ of each pore in the filtration tubes 4 may be smaller than approximately 1.5 mm. In accordance with an embodiment, thickness δ of each pore in the filtration tubes 4 can be approximately 10 microns (inclusive) to approximately 1500 microns (inclusive). In another embodiment, the thickness δ of each pore is approximately 100 microns (inclusive) to 1000 microns (inclusive). In yet another embodiment, thickness δ of each pore in the filtration tubes 4 is approximately 100 microns (inclusive) to approximately 500 microns (inclusive). In still yet another embodiment, thickness δ of each pore in the filtration tubes 4 is approximately 100 microns (inclusive) to approximately 300 microns (inclusive).

For illustrative purposes only, the pores are labeled as pores 44 in FIG. 17. However, as noted above, the pores illustrated in FIG. 17 may be of any size, shape, configuration, and/or arrangement. As shown, the openings 46 of the pores 44 are may be provided on an outer surface 24. Also, the diameter 4 of each of the pores 44 decreases towards its opposite end or opening 54 provided on inner surface 22. That is, each of the pores 44 preferably are conical or conoidal in shape. The degree of conicity, as indicated by the angle of the side wall, can be expressed as the ratio of the diameter of the larger opening 46 to the diameter of the smaller opening 54, or φ:φ2. This ratio may vary along the longitudinal or vertical extent of the filtration tube 4. When referring to pore size herein, the values are representative of the diameter 54, or the smaller of the openings. The pore size can be determined above, based on, inter alia, the material to be filtered, the drilling capabilities, as well as the material used to fabricate the sheet (or tube). Once the pore size is determined, the degree of conicity then can be determined based on the drilling apparatus capabilities, and the strength of the material used. The opening 46 cannot be so large as to adversely impact the structural integrity of the device. In an embodiment, the degree of conicity, (φ:φ2) is from about 1.1 to about 4:1, or from about 1.4:1 to about 3:1, or from about 1.5:1 to about 2:1. Using the guidelines provided herein, those skill in the art will be capable of fabricating a suitable filtration apparatus having an appropriate degree of conicity.

Such a configuration (conoid in the thickness direction, with a larger opening 46 or mouth on one side (e.g., entrance side for filtrate) and a desired or controlled size with a smaller opening 54 on the other side (e.g., exit side or the filtrate)) allows for catching of solids within filtrate being filtered through the filtration tubes, and enables more efficient back-flushing.

Multiple filtration bundles and elements 102, 104, etc. can be assembled to meet specific filtration requirements for any number of industries. As previously noted above, filtration processes are designed to allow filtrate to flow inward from the larger mouth to the smaller opening of the pores/holes, while, during backwash, fluid flows in an opposite direction (outward) to remove embedded particles or cake in the holes during the regeneration (cleaning or washing) of the filtration media.

Figure 18:
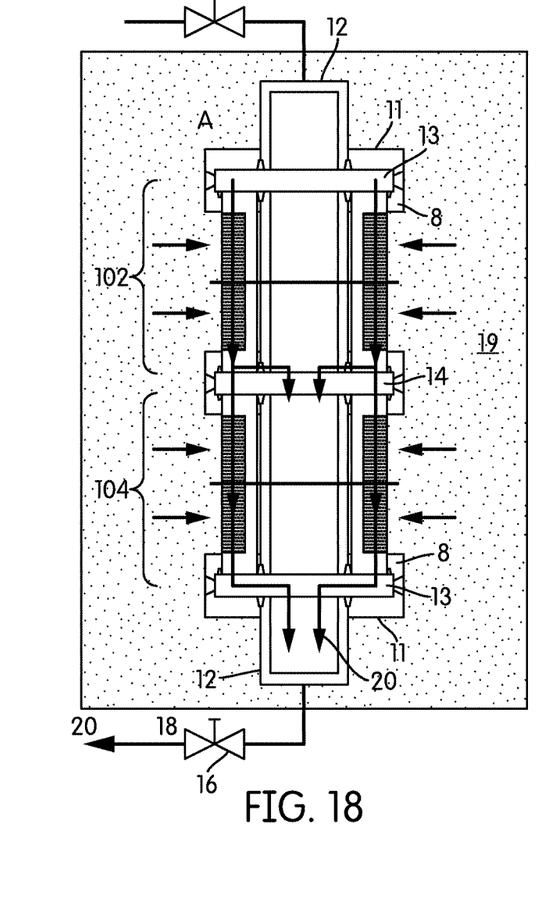
FIG. 18 illustrates a method of use of a filtration assembly as shown in FIG. 1 with an inlet piping system and an outlet piping system connected thereto in accordance with an embodiment.
Figure 19:
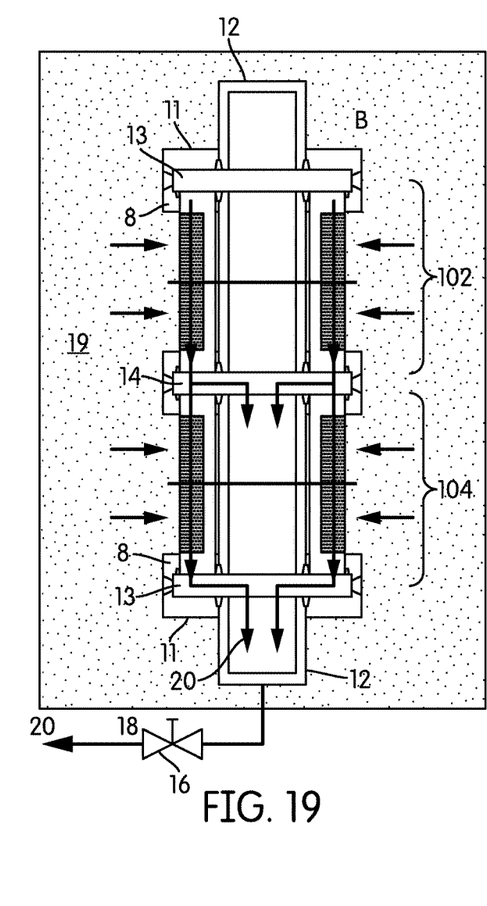
FIG. 19 illustrates a method of use of a filtration assembly as shown in FIG. 1 with an outlet piping system connected thereto in accordance with another embodiment.
Figure 20:
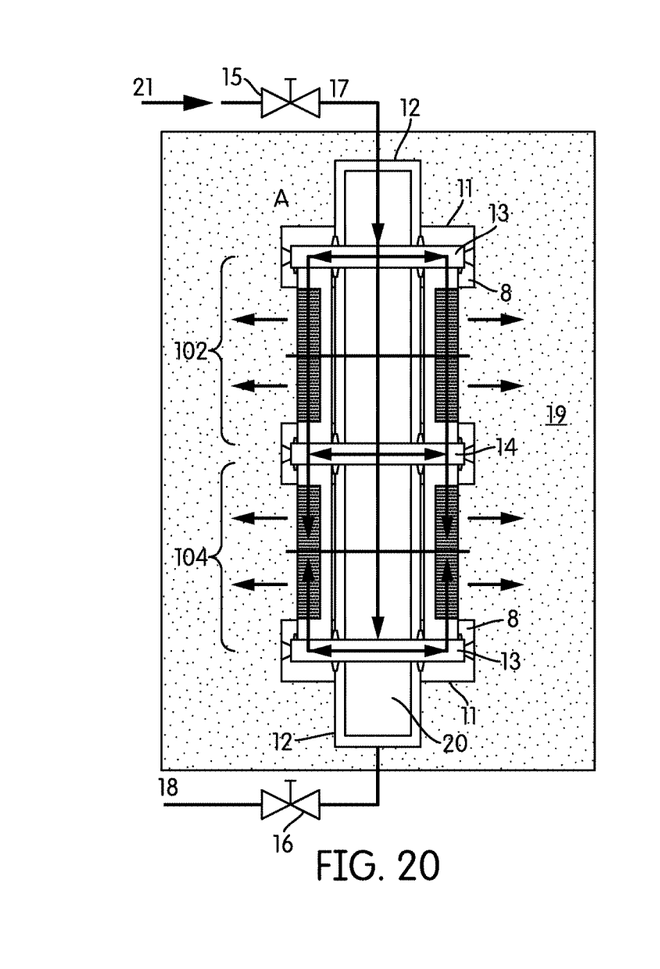
FIG. 20 illustrates a method of backwashing a filtration assembly as shown in FIG. 1 with an inlet piping system and an outlet piping system connected thereto in accordance with an embodiment.

For example, these elements 102 and 104 may be assembled as an assembly 100 for connection to a piping configuration of a filtration system, examples of which are shown in FIGS. 18 and 19. In one embodiment, for example, both ends of the filtration assembly 100 may be connected to pipes 17, 18 via conduit tubes 12, through two-way valves 15, 16, as shown in FIG. 18. In another embodiment, the filtration assembly 100 has one end (e.g., bottom) or conduit tube 12 connected to the pipe 18 through a two-way valve 16.

During filtration, the filtration assembly 100 can be positioned vertically in an environment where the filtrate 19 is forced at pressure to flow inward from the larger opening 46 to the smaller opening 54 of the pores or holes of the filtration tubes 4, as indicated by arrows in FIGS. 18 and 19. The filtrate 19 can be fed horizontally into the filtration tubes 4 towards the central support tube 7. In the depiction in the figures, any liquid or filtrate that is fed into the filtration tubes 4 of the (top) filtration element 102 feeds downwardly (e.g., via gravity) towards the free space 14 of the connected connectors 8, and may flow into the free space 14 and thus downwardly through the filtration tubes 4 and/or the central support tube 7 of the (bottom) filtration element 104. Solids are thus collected in the small filtration tubes 4 of both elements, and may be collected in the central support tube 7 (of element 104) as well. For example, solid particles may be accumulated on the outside surface of the filter tubes as filter cake. The filtrate 19 then leaves the filter assembly 100 at the bottom. More specifically, in the configuration of FIG. 18, valve 15 is closed and valve 16 is open. In the configuration of FIG. 19, valve 16 is open, the filtrate forced into the internal space of the filtration elements 102 and 104 is washed and cleaned in both embodiments. The cleaned fluid 20 in the upper part of the element 102 flows down through the internal space of filtration tubes 4 to the connecter space 14 in the middle, further flows down through both filtration tubes 4 and the central support tube 7 and joins in the cleaned fluid in the lower part of the element 104, finally through the free space 13 between the connecter 8 and the joint headcap 11, and finally to the conduit tube 12 at the bottom of the filtration assembly 100, from which the cleaned fluid 20 is introduced into the pipeline 18 through the opened valve 16.

Figure 21:
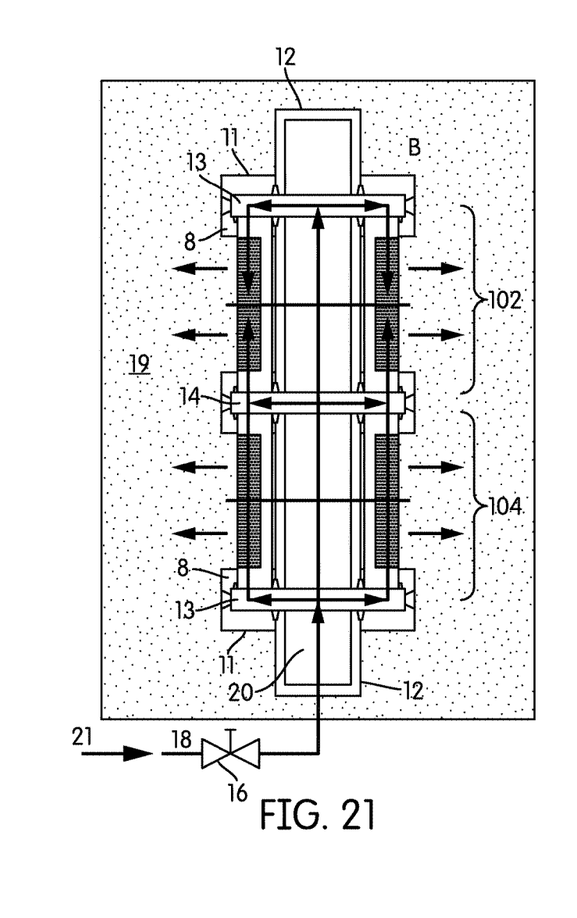
FIG. 21 illustrates a method of backwashing a filtration assembly as shown in FIG. 1 with an outlet piping system connected thereto in accordance with another embodiment.

After a period of filtration, clean flushing fluid (liquid or gas) can be pressed or back flushed into the filtration assembly 100 through pipes connecting the conduit tube 12 at the ends of the assembly 100. During a back flushing stage, shown in FIGS. 20 and 21, high pressure clean flushing fluid 21 is introduced from a pipe by opening valve 15 (FIG. 20) to a conduit tube. The pressure of the flushing fluid 21 may be higher than the pressure in the environment of the fluid to be filtrated (or filtrate). As depicted by the arrows in FIGS. 20 and 21, the flushing fluid 21 is uniformly distributed to the entire inside space of the elements 102 and 104 through the central support tube 7 and filtration tubes 4. More specifically, in the configuration of FIG. 20, the flushing fluid 21 is introduced via pipe 17 to a top conduit tube 12 at the top of the filtration assembly 100 by opening valve 15 to a clean flushing fluid source. The flushing fluid 21 is fed downwardly through conduit tube 12 into free space 13 at the top, for feeding downwardly through the filtration tubes 4 and central support tubes 7 of the elements 102 and 104 and other free spaces 14 and 13 of the connectors 8 and headcaps 11 (see arrows). In FIG. 21, flushing fluid 21 is introduced via pipe 18 to a bottom conduit tube 12 at the bottom of the filtration assembly 100 by opening valve 16 to a clean flushing fluid source. The flushing fluid 21 is fed upwardly through conduit tube 12 into free space 13 at the bottom, for feeding upwardly through the filtration tubes 4 and central support tubes 7 of the elements 102 and 104 and other free spaces 14 and 13 of the connectors 8 and headcaps 11 (see arrows). In both embodiments, the flushing fluid 21 is forced into the filtration tubes 4 to pass through the porous walls outwardly to remove the filter cake from the exterior or outer surface 24 of the filter elements. More specifically, the introduced flushing fluid 21 will flow into the entire internal space of the element in both FIGS. 20 and 21, causing the pressure to raise up. The high pressure inside the elements formed as compared to that of the filtering environment (as shown in FIGS. 18 and 19) by the flushing fluid 21 forces the flushing fluid 21 to push the porous filtration surfaces and any cake formed during a filtration stage, leading to removal of the cake by the flushing fluid 21 passing through the pores on the filtration surfaces 5 and such cleaning of the filtration element. The advantage of the structure in this event (for back flushing) is that the central support tube 7 provides a channel to allow flushing fluid quickly to be transferred to the other end of the element from the introducing end. This will provide more uniform distribution of pressure along the element and impose a better cleaning effect to all the filtration surfaces.

Accordingly, the disclosed designs provides an improved structure for the backwash of a tubular filtration element. In addition, when multiple such assembled filtration elements 102, 104, etc. are used in a large vessel (e.g., as a filtration assembly 100) such as in reactors, the elements can be arranged to allow half of the elements to be operated in filtration stage, while the remaining elements are operated in backwash stage, in order to minimize the effect of filtration/backwash on the hydrodynamics in the vessel, which may affect the heat and mass transfer in some reactors. In addition, the present media used to form the tube bundle has much higher mechanical strength and high hole opening coverage ratio on the filter tubes 4 than traditional sintered rigid meshes or the filter web.

The filtration assembly described herein can be particularly useful in industrial processes in which the filter cake is not intended to be recovered, or is recovered only after extended periods of time. For example, the filtration assembly described herein can be particularly useful in an industrial process involving the use of solid catalyst particles that are eventually exhausted (or spent) over a period of time but are re-used for an extended period of time. A preferred industrial process in which the filtration assembly described herein is useful is a Fischer Tropsch process, involving the use of catalysts to convert gases such as carbon monoxide into liquid hydrocarbons. Such processes are disclosed, for example, in U.S. Pat. Nos. 5,599,849; 5,844,006; 7,378,452; 7,488,760; 8,022,109; and 8,778,193, the disclosures of each of which are incorporated by reference herein in their entireties.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected is set forth in the following claims.

What is claimed is:

1. A filtration element comprising:
    a central support tube comprising a first diameter having a closed tube surface;
    a plurality of filtration tubes circumferentially surrounding the central support tube, each of the filtration tubes having a second diameter that is smaller than the first diameter of the central support tube,
    wherein each of the filtration tubes comprises a wall, wherein the wall comprises a closed wall portion and an open wall portion, wherein the open wall portion comprises pores extending at least halfway around a surface of the filtration tube for filtering solids from fluids, each of the pores extending through a thickness of the wall of the filtration tube and comprising a conical shape, and
    wherein each of the filtration tubes are positioned around the central support tube such that the closed wall portion faces inwardly and is positioned adjacent to the closed tube surface of the central support tube and the open wall portion and its pores are facing outwardly relative to the closed tube surface of the central support tube.

2. The element according to claim 1, wherein the pores of each filtration tube comprise a diameter between about 0.25 µm to about 1,000 µm.

3. The element according to claim 1, wherein each of the filtration tubes comprises an inner diameter between about 1 mm to about 50 mm.

4. The element according to claim 3, wherein each of the filtration tubes comprises a wall thickness between about 50 µm to about 2,000 µm.

5. The element according to claim 4, wherein each of the filtration tubes comprises a wall thickness between about 100 µm to about 1,500 µm.

6. The assembly according to claim 5, wherein each of the filtration tubes comprises a wall thickness between about 200 µm to about 1,000 µm.

7. The assembly according to claim 3, wherein the central support tube comprises an inner diameter between about 5 mm to about 400 mm.

8. A filtration assembly comprising:
    at least a first filtration element connected to a second filtration element, each of the first filtration element and the second filtration element comprising:
        a central support tube comprising a first diameter having a closed tube surface;
        a plurality of filtration tubes circumferentially surrounding the central support tube, each of the filtration tubes having a second diameter that is smaller than the first diameter of the central support tube,
        wherein each of the filtration tubes comprises a wall, wherein the wall comprises a closed wall portion and an open wall portion, wherein the open wall portion comprises holes extending at least halfway around a surface of the filtration tube, each of the holes extending through a thickness of the wall of the filtration tube and comprising a conical shape, and wherein each of the filtration tubes are positioned around the central support tube such that the closed wall portion faces inwardly and is positioned adjacent to the closed tube surface of the central support tube and the open wall portion and its holes of each of the filtration tubes are facing outwardly relative to the closed tube surface of the central support tube in each filtration element; and
    a connector connecting the first filtration element to the second filtration element.

9. The assembly according to claim 8, wherein the first filtration element and the second filtration element are stacked vertically relative to one another.

10. The assembly according to claim 8, wherein the holes of each filtration tube comprise a diameter between about 0.25 µm to about 1,000 µm.

11. The assembly according to claim 10, wherein each of the filtration tubes comprises an inner diameter between about 1 mm to about 50 mm.

12. The assembly according to claim 11, wherein each of the filtration tubes comprises a wall thickness between about 50 µm to about 2,000 µm.

13. The assembly according to claim 12, wherein each of the filtration tubes comprises a wall thickness between about 100 µm to about 1,500 µm.

14. The assembly according to claim 13, wherein each of the filtration tubes comprises a wall thickness between about 200 µm to approximately 1,000 µm.

15. The assembly according to claim 11, wherein the central support tube comprises an inner diameter between about 5 mm to about 400 mm.

* * * * *